(12) United States Patent
DeCerbo, Jr.

(10) Patent No.: US 10,296,182 B2
(45) Date of Patent: May 21, 2019

(54) MANAGED ACCESS GRAPHICAL USER INTERFACE

(71) Applicant: ShawnTech Communications, Inc., Dayton, OH (US)

(72) Inventor: Daniel Anthony DeCerbo, Jr., Troy, OH (US)

(73) Assignee: Shawntech Communications, Inc., Dayton, OH (US)

( * ) Notice: Subject to any disclaimer, the term of this patent is extended or adjusted under 35 U.S.C. 154(b) by 0 days.

(21) Appl. No.: 15/097,222

(22) Filed: Apr. 12, 2016

(65) Prior Publication Data

US 2017/0181054 A1    Jun. 22, 2017

Related U.S. Application Data

(60) Provisional application No. 62/269,073, filed on Dec. 17, 2015.

(51) Int. Cl.
| | |
|---|---|
| *H04M 1/66* | (2006.01) |
| *G06F 3/0484* | (2013.01) |
| *H04M 3/22* | (2006.01) |
| *H04W 4/021* | (2018.01) |
| *H04M 7/00* | (2006.01) |
| *H04L 29/08* | (2006.01) |
| *H04W 12/08* | (2009.01) |
| *H04L 29/06* | (2006.01) |

(52) U.S. Cl.
CPC ............ *G06F 3/0484* (2013.01); *H04L 67/34* (2013.01); *H04L 67/40* (2013.01); *H04M 3/2281* (2013.01); *H04M 7/0012* (2013.01); *H04W 4/021* (2013.01); *H04W 12/08* (2013.01); *H04L 67/1095* (2013.01)

(58) Field of Classification Search
CPC ....... H04W 4/02; H04W 12/02; H04W 12/06; H04W 12/08; H04W 12/12; H04W 76/02
USPC ...................... 455/410, 411, 422.1
See application file for complete search history.

(56) References Cited

U.S. PATENT DOCUMENTS

| | | | |
|---|---|---|---|
| 2007/0041545 A1* | 2/2007 | Gainsboro | H04M 3/2281 379/188 |
| 2009/0076823 A1* | 3/2009 | Collins | G10L 15/22 704/270.1 |
| 2014/0194084 A1* | 7/2014 | Noonan | H04W 8/005 455/404.1 |

(Continued)

*Primary Examiner* — Temica M Beamer
(74) *Attorney, Agent, or Firm* — Arent Fox LLP

(57) ABSTRACT

A Managed Access System (MAS) at a correctional facility includes a local database for storing data relevant to authorized and unauthorized cellular communications activity, and a graphical user interface (GUI) for accessing the data and adjusting MAS settings. The local database is capable of synchronization with a remote database at a central facility. The central facility may include a processing system having code for monitoring the MAS and, in some configurations, additional MASs located at other correctional facilities. The code and the remote database may be configured to interface with the local databases at these other correctional facilities. A synchronization operation between the remote database and one or more local databases may be performed by a user with appropriate permissions. In this manner, an authorized user at the central facility can access the different MAS systems at different correctional facilities and manage the data or settings.

46 Claims, 15 Drawing Sheets

(56) References Cited

U.S. PATENT DOCUMENTS

2016/0191484 A1* 6/2016 Gongaware ............. H04L 63/08
  726/7
2016/0255189 A1* 9/2016 Hodge .................... H04M 1/67
  379/88.02
2017/0094534 A1* 3/2017 Salyers ................. H04W 24/02

* cited by examiner

| TIME | SIMs | HARDWARE ID | CARRIER | NAME | Rx LEVEL (dBm) | BAND |
|---|---|---|---|---|---|---|
| 05-11-2012 02:41:04 | 31041031 | | | | -105 | GSM 1900 |
| 05-11-2012 02:59:39 | 31069050 | | | | -105 | GSM 850 |
| 05-11-2012 02:56:08 | 31041031 | | **DETECTED MESSAGE\*\*** | | -103 | GSM 1900 |
| 05-11-2012 02:42:04 | 31041036 | | RECEIVER #: 555-555-9568 | | -102 | GSM 1900 |
| 05-11-2012 02:42:43 | 31069050 | | SEND 2 LBS OF LOUD - I GOT $ | | -102 | GSM 1900 |
| 05-11-2012 03:42:05 | 31041034 | | 402 | | -101 | GSM 1900 |
| 5/11/2012 3:01 | 31041042 | | RECEIVER #: 555-555-4793 | | -98 | GSM 1900 |
| 05-11-2012 02:41:05 | 31041052610714 9 | 012679 | SEND TO JOHN DOE #123456 DAYTON CORRECTIONAL 123 MAIN ST. DAYTON, OH 45401 | | -96 | GSM 1900 |
| 05-11-2012 03:06:55 | 31069050127858 7 | 354660 | | | -96 | GSM 1900 |
| 05-11-2012 02:43:58 | 31041036103660 6 | 353491 | 404 | | -96 | GSM 1900 |
| 05-11-2012 03:02:40 | 31069050127858 7 | 354660 | | | -90 | GSM 850 |
| 05-11-2012 02:55:51 | 31041034280173 0 | 012172 | | | -89 | GSM 1900 |

DEVICES OVERVIEW

DASHBOARD | SYSTEM ▼ | DEVICES ▼ | INVESTIGATIONS ▼ | AUTHORIZATIONS | USERS ▼ | REPORTS ▼ | ADMINISTRATION ▼

○ USING REMOTE CONNECTION | REPORT A PROBLEM
○ CONNECTED TO SANDBOX | C5 CLIENT RC2, v3.5

○ USER DEV LOGGED IN
LOGOUT  CHANGE PASSWORD

VIEW CURRENT DEVICE ACTIVITY

FILTER TYPE: DEVICE TYPE   FILTER VALUE:

☑ AUTO REFRESH ON

| GROUP | DEVICE TYPE | SUBSCRIBER ID | HARDWARE ID | CARRIER | HARDWARE MODEL | FIRST CAPTURED ON | LAST CAPTURED ON | | |
|---|---|---|---|---|---|---|---|---|---|
| UNAUTHORIZED | CDMA | 31000859974159 | 80b58a7b | OTHER | DUAL-MODE HANDSET | 10/14/2012 5:08:40 AM | 10/14/2012 5:08:40 AM | DETAILS | INVESTIGATION |
| UNAUTHORIZED | CDMA | 31000859341732 | 80702ab | OTHER | DUAL-MODE HANDSET | 10/14/2012 5:08:39 AM | 10/14/2012 5:08:39 AM | DETAILS | INVESTIGATION |
| UNAUTHORIZED | CDMA | 31000859772373 | 80a86429 | OTHER | DUAL-MODE HANDSET | 10/14/2012 5:08:39 AM | 10/14/2012 5:08:39 AM | DETAILS | INVESTIGATION |
| UNAUTHORIZED | CDMA | 31000859570918 | 806140ff | OTHER | DUAL-MODE HANDSET | 10/14/2012 5:08:37 AM | 10/14/2012 5:08:37 AM | DETAILS | INVESTIGATION |
| UNAUTHORIZED | CDMA | 31000805459586 | 806cc8bb | OTHER | DUAL-MODE HANDSET | 10/14/2012 5:08:37 AM | 10/14/2012 5:08:37 AM | DETAILS | INVESTIGATION |
| UNAUTHORIZED | CDMA | 31000859678880 | 80b85bcb | OTHER | DUAL-MODE HANDSET | 10/14/2012 5:08:29 AM | 10/14/2012 5:08:29 AM | DETAILS | INVESTIGATION |
| UNAUTHORIZED | CDMA | 31000859314323 | 80b39792 | OTHER | DUAL-MODE HANDSET | 10/14/2012 5:08:26 AM | 10/14/2012 5:08:26 AM | DETAILS | INVESTIGATION |
| UNAUTHORIZED | CDMA | 31000859267356 | 8071aa39 | OTHER | DUAL-MODE HANDSET | 10/14/2012 5:08:19 AM | 10/14/2012 5:08:19 AM | DETAILS | INVESTIGATION |
| UNAUTHORIZED | CDMA | 31000859967793 | 80dd3d6b | OTHER | DUAL-MODE HANDSET | 10/14/2012 5:08:19 AM | 10/14/2012 5:08:19 AM | DETAILS | INVESTIGATION |
| UNAUTHORIZED | CDMA | 31000216317209 | 800eafe2 | OTHER | DUAL-MODE HANDSET | 10/14/2012 5:08:17 AM | 10/14/2012 5:08:17 AM | DETAILS | INVESTIGATION |
| UNAUTHORIZED | CDMA | 31000859707147 | 8058789c | OTHER | DUAL-MODE HANDSET | 10/14/2012 5:08:12 AM | 10/14/2012 5:08:12 AM | DETAILS | INVESTIGATION |

Fig. 7

MANAGED ACCESS GRAPHICAL USER INTERFACE

CROSS-REFERENCE TO RELATED APPLICATIONS

This application claims the benefit of and right of priority to Provisional Patent Application No. 62/269,073 entitled "MANAGED ACCESS GRAPHICAL USER INTERFACE" filed Dec. 17, 2015, the entire contents of which are herein incorporated by reference as if fully set forth herein.

BACKGROUND

Field

The present disclosure relates generally to surveillance technology, and more specifically to techniques for data collection relevant to wireless device activity.

Background

The corrections industry has a unique need for the highest level of safety and security. Contraband cellular telephones and other wireless devices in correctional institutions can pose a significant threat to the safety of the public, prison staff and other prisoners. For example, inmates with unauthorized cellular telephone access have used them to conduct illegal activities such as organizing and running various criminal enterprises, encouraging and coordinating riots, intimidating witnesses, ordering hits, arranging for the delivery of other types of contraband into the facility, furthering gang activity, and the like.

To achieve the need for oversight and prevention of unauthorized cellular activity at a correctional institution, it is desirable to have a system that effectively manages and permits authorized wireless communications, such as emergency cellular telephone phone calls and calls made by prison officials, while concurrently preventing unauthorized wireless activity conducted within the facility. It is further desirable to gather relevant and potentially actionable data concerning the unauthorized use of such wireless devices by individuals at that institution.

These objectives have traditionally been achieved, in part, using a managed access system (MAS) at the institution. A MAS is a system that deploys a secure cellular umbrella over a specified area within the bounds of the institution to either permit or to interfere with transmissions of mobile wireless devices within the facility. The MAS can prevent unauthorized cell phones from sending and receiving calls, text messages and data transmissions. When a cellular device is powered on, it typically scans for compatible signals from base stations in the area and locks onto a compatible base station with the highest quality signal. The MAS is a network of small cellular sites within the prison walls. This network transmits a signal that is stronger than the carrier's base stations, causing all cellular phones within the covered area to connect to the prison network instead. The system can identify individual cellular telephones and SIM cards using information sent by the phones themselves. Transmissions from authorized devices may be passed onto the carrier's network over an internet connection. Transmissions from unauthorized devices can be interrupted and the wireless activity thereby prevented.

Correctional facilities have employed various software systems for managing authorized wireless activity and for preventing unauthorized wireless activity. These systems, however, have a number of shortcomings. For example, many such systems lack adequate functionality to support the process of gathering actionable data for investigators. Further, these available systems lack remote management and oversight capability for authorized users located outside of the correctional institution. In addition, the available computing infrastructures are restricted to providing local oversight of one facility, at that facility. In the case where a supplier of MAS technology has been tasked with providing solutions for a number of different correctional facilities in different geographical regions, present systems available to the supplier lack an integrated control and management structure for these different facilities.

The present disclosure addresses these and other shortcomings.

SUMMARY

Processing systems, systems, methods and computer readable media are disclosed.

In one aspect of the disclosure, a Managed Access System (MAS) at a correctional facility includes a computer readable medium comprising a local database and code, and one or more processors configured to execute the code, wherein the code is configured when executed by the processors to enable management of data relevant to wireless communications activity at the correctional facility and storage of the data in the local database, provide a graphical user interface (GUI) for enabling an authorized user to modify configuration settings and access the stored data, and interface with a processing system at a remote location to enable access to the data at the remote location over a network connection.

In another aspect of the disclosure, a processing system includes a computer readable medium including a remote database and code configured to interface with one or more Managed Access Systems (MASs) located respectively at one or more correctional facilities, each of the one or more MASs being configured to enable management via a graphical user interface (GUI) of cellular communications activity occurring at the respective correctional facility and comprising a local database for storing data relevant to the cellular communications activity, wherein the remote database is configured to synchronize with each of the local databases over a network connection to enable a remote user to access the data, and one or more processors configured to execute the code.

In another aspect of the disclosure, a processing system at a correctional facility includes a computer readable medium including code for providing at the correctional facility a managed access system (MAS), the MAS comprising a local graphical user interface (GUI) and a local database and configured to record data relevant to cellular communications activity occurring at the correctional facility for storing in the local database and to enable an authorized user via the local GUI to access the stored data and to manage the cellular communications activity, and one or more processors configured to execute the code, wherein the local database is configured to synchronize with a remote database outside the correctional facility over a network connection to enable a remote user to manage the data via a remote GUI.

In another aspect of the disclosure, a system for managing wireless communications includes a local processing system located at a correctional facility and including a local computer readable medium comprising local code for providing at the correctional facility a managed access system (MAS), the MAS comprising a local graphical user interface (GUI) and a local database accessible via the local GUI, the MAS being configured to record data relevant to wireless communications activity occurring at the correctional facility for storing in the local database and to enable an authorized user via the local GUI to access the stored data and to manage the cellular communications, and one or more local processors configured to execute the code, and a remote processing system located outside of the correctional facility and including a remote computer readable medium comprising a remote database and remote code configured to interface with the MAS, wherein the remote database is configured to synchronize with the local database over a network connection to enable a remote user to access or manage the data at the correctional facility, and one or more remote processors configured to execute the code.

In another aspect of the disclosure, a method for Managed Access System (MAS) management includes providing a graphical user interface (GUI) to a local database at a correctional facility, the GUI and local database being included as part of a Managed Access System (MAS) at the correctional facility for regulating cellular communications activity occurring at the correctional facility, providing code for enabling management by a user via the GUI of the cellular communications activity and for storage of collected data relevant to the cellular communications activity in the local database, providing code for enabling synchronization, over a network connection, between the local database and a remote database located on a processing system outside the correctional facility, wherein the remote database is accessible by an authorized user via a remote interface for adjusting a configuration of the MAS.

In another aspect of the disclosure, a non-transitory computer readable medium includes processor-executable code for interfacing with one or more Managed Access Systems (MASs) located respectively at one or more correctional facilities, each of the one or more MASs including a local database for storing data relevant to cellular communications activity at the respective correctional facility, providing a graphical user interface (GUI) for managing the cellular communications activity and for configuring settings of the one or more MASs, interfacing with a central database, and synchronizing the central database with the one or more MASs.

BRIEF DESCRIPTION OF THE DRAWINGS

FIG. 4 is a screen view of a data report of a graphical user interface.

FIG. 7 is a screen view of a gridview display of the graphical user interface.

DETAILED DESCRIPTION

Figure 1:
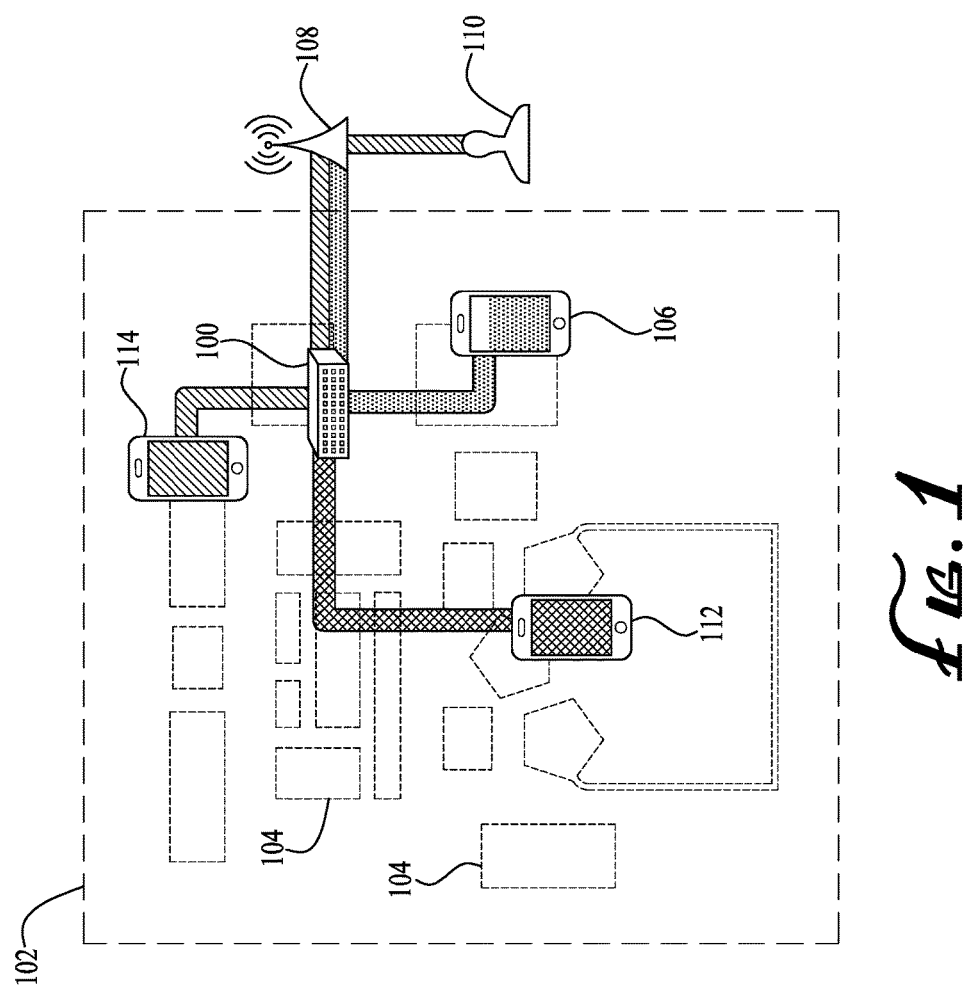
FIG. 1 is a diagram of a managed access system in a correctional facility.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of MASs will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing system may include a computer-readable medium.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. A computer-readable medium may be a discrete storage component, such as a hard drive, or in some configurations it may be a plurality of discrete storage components distributed across multiple devices. Storage media may be any available media that can be accessed by a computer. By way of example, and not limitation, such computer-readable media can comprise random-access memory (RAM), read-only memory (ROM), electronically erasable programmable ROM (EEPROM), compact disk (CD) ROM (CD-ROM), or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a conceptual diagram of an MAS 100. The MAS 100 is located within the geographical region of the correctional facility 102, which may include a campus of various buildings 104 such as housing units, administrative units, and the like. Using an appropriate software interface to access the MAS 100, a corrections officer can authorize specific wireless devices such as cellular telephone 106 for use within the facility 102 so that, for example, corrections personnel can communicate at the facility using their respective wireless devices. These communications are provided via a cellular signal source 108 (such as a cell tower and base station) and to and from a Public Safety Answering Point (PSAP) 110, so that the authorized user of phone 106 can communicate with an intended recipient via the MAS 100 and the external cellular signal source 108. Communications from other wireless devices that are not authorized for use, such as a contraband cellular telephone 112, are intercepted by the MAS hardware, and data associated with the unauthorized wireless activity is collected by the MAS 100 for rendering in a useable format on the software interface. In one configuration, the MAS 100 is configured to permit only emergency (911) calls from unauthorized devices such as device 114. The emergency call from device 114 is routed via the MAS 100 to a Public Safety Answering Point 110.

To receive authorized signals and intercept unauthorized signals within a defined geographical umbrella that typically encompasses the facility 102, the MAS 100 may include a base transceiver station coupled via fiber interface to a distributed antenna system. A central controller or server, which may reside on one or more computing devices within the facility, may be configured to store data received via the base transceiver stations and to perform the oversight functions for authorized wireless activity and the interception and associated data gathering of unauthorized wireless activity.

Use of a MAS in a correctional facility has several known features and benefits. A MAS can be used to cover all available wireless carriers and may be used to provide robust and reliable intelligence reporting. A MAS may systematically manage communications with no effort from and no interference to the carriers, since the MAS does not jam cellular phones. The MAS is also scalable for a straightforward migration of future technologies. As disclosed herein in an aspect of the disclosure, the MAS may be systematically monitored through a Network Operations Center (NOC) or other centralized facility.

Figure 2:
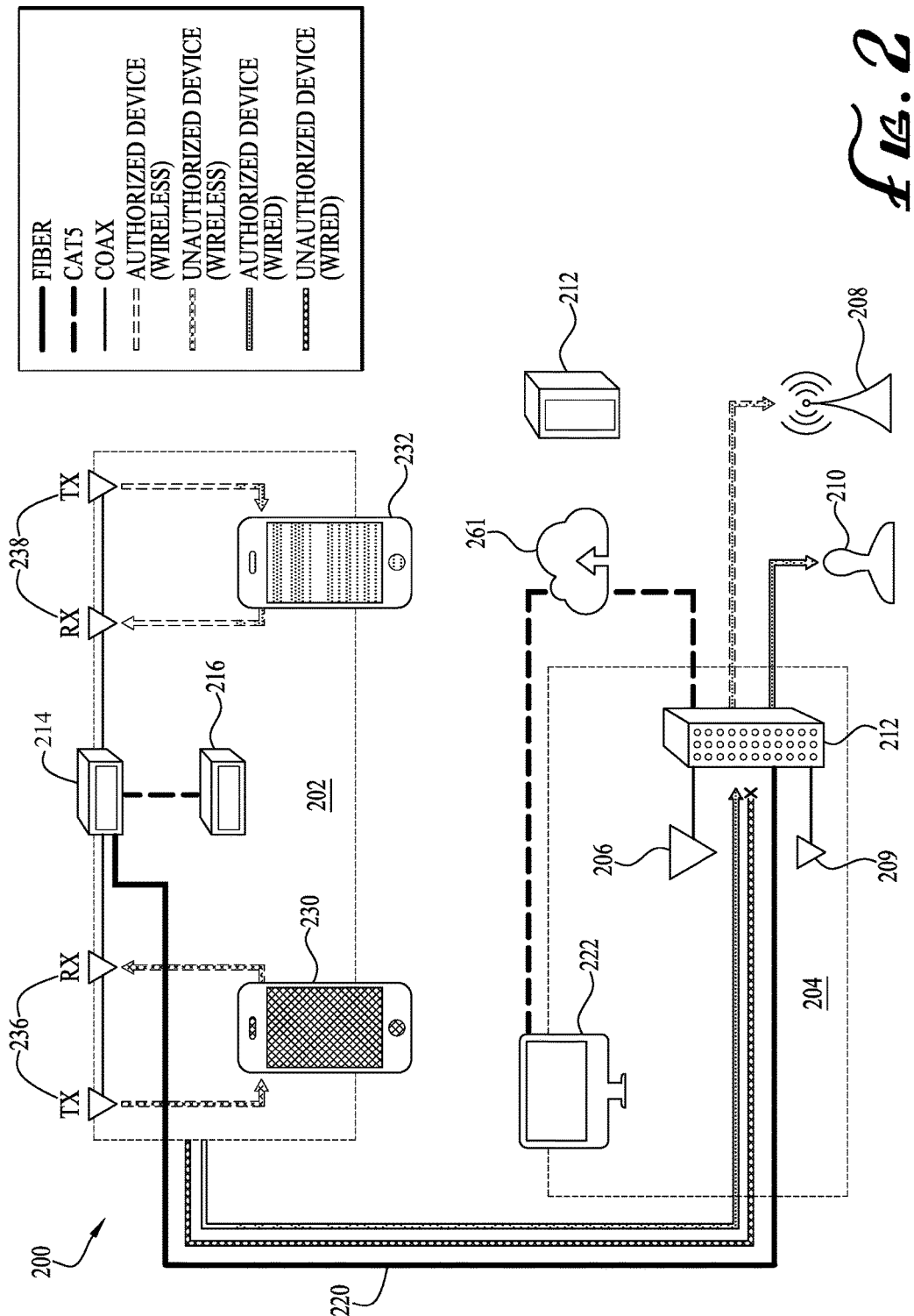
FIG. 2 is a diagram of an implementation of a managed access system in a correctional facility.

FIG. 2 is a diagram of an implementation of an MAS 200 in a correctional facility including a housing unit 202 and an administration building 204. Housing unit 202 includes a remote unit 214, which is coupled to a power distribution unit (PDU) 216 via a CAT5 interface. PDU 216 is the power source for remote unit 214. Remote unit 214 is coupled to transmitter/receiver components 236 and 238 via a coaxial connection. Authorized cellular device 232 is shown to be sending and receiving wireless signals to and from transmitter/receiver components 238. Unauthorized cellular device 230 is shown to be sending and receiving wireless signals to and from transmitter/receiver components 236. The wireless signals are received by remote unit 214 via the coaxial connection and routed via the fiber connection 220 to the head end unit 212 in administration building 204. The remote unit 214 is a component of the DAS and connects to the primary DAS hub at the head end unit 212 to receive its RF signals.

Head end unit 212 is coupled to network analyzer 206 and GPS unit 209. Head end unit 212 includes the base stations and the core elements of the system (e.g., computing devices on which the MAS applications are executed). Network analyzer 206 is part of the system core and functions to monitor the carrier environment and report changes in the wireless network. GPS unit 209 functions as a clock sync for the base stations. Head end unit 212 is connected via a CAT5 interface to a private cloud 261 which is configured to enable internet access, and a client GUI for enabling management of the various MAS systems. Head end unit 212 receives the signals over the fiber connection that originated from the unauthorized device 230 and the authorized device 232. The signals originating from the unauthorized device 230 are blocked by the system. As shown in the figure, data obtained from the unauthorized wireless transmissions may be routed to a remote data center 212 external to the correctional facility. Head end unit 212 sends communications from authorized device 232 intended for a landline to the Publicly Switched Telephone Network (PSTN) 210 for releasing authorized devices and unauthorized devices for 911 calls only. Head end unit 212 also sends communications relating to authorized wireless devices (e.g., intended for another cell device) to cellular signal source 208 for releasing the authorized devices to the carrier network.

From the above, description, it is noted that with MAS 200, unauthorized wireless communications are intercepted and data concerning those communications are collected for potential use by investigators or other personnel.

Figure 14:
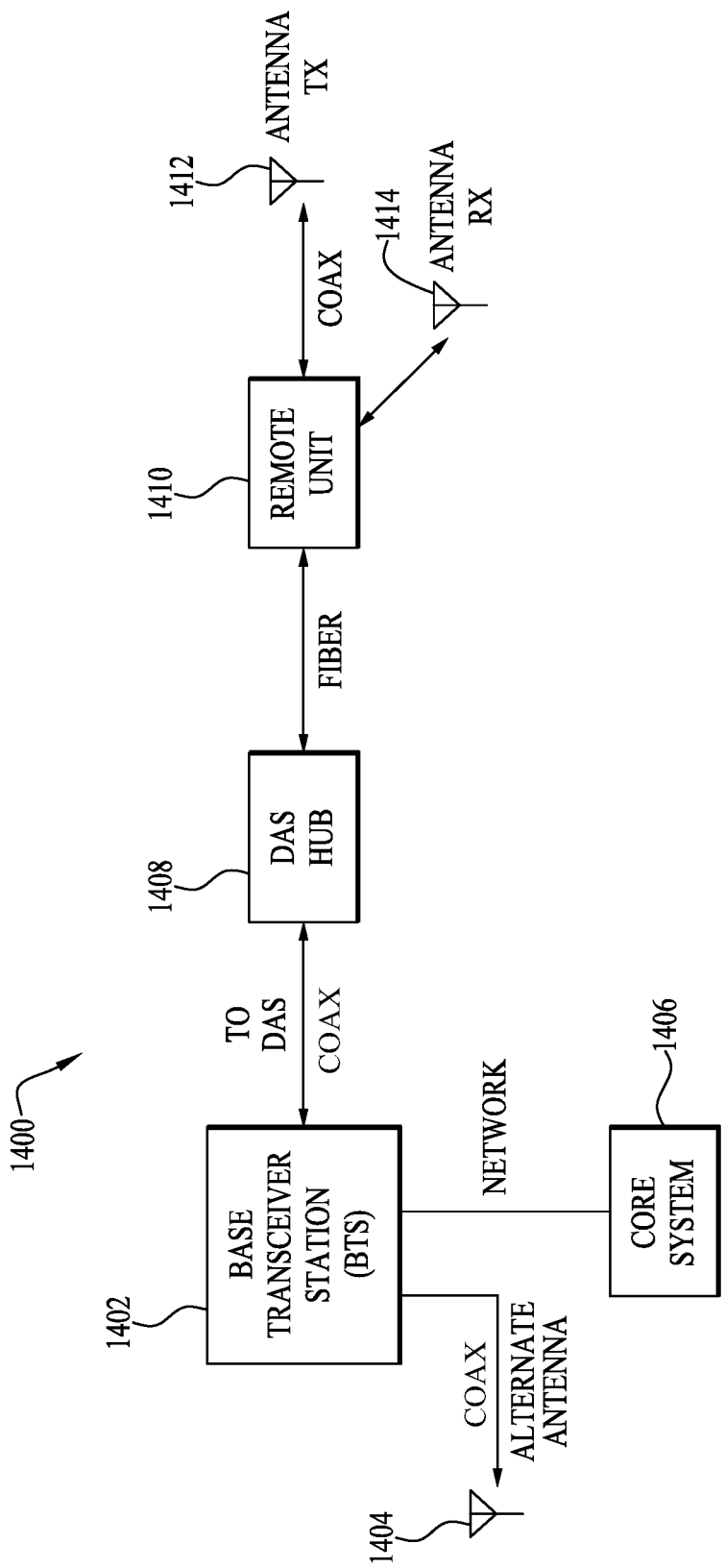
FIG. 14 is a system diagram of the MAS.

FIG. 14 is a system diagram 1400 of the MAS. Base transceiver station (BTS) 1402 is coupled to DAS hub 1408 via a coaxial cable connection. BTS 1402 is further coupled to alternate antenna 1404 via a coaxial cable connection and is networked to the core system 1406, which includes the processing system for executing MAS applications. DAS hub 1408 in turn is coupled to remote unit 1410 via another fiber connection. Remote unit 1410 is coupled to transmit antenna 1412 and receive antenna 1414 for sending and receiving signals from wireless devices to the appropriate carrier interface.

Figure 3:
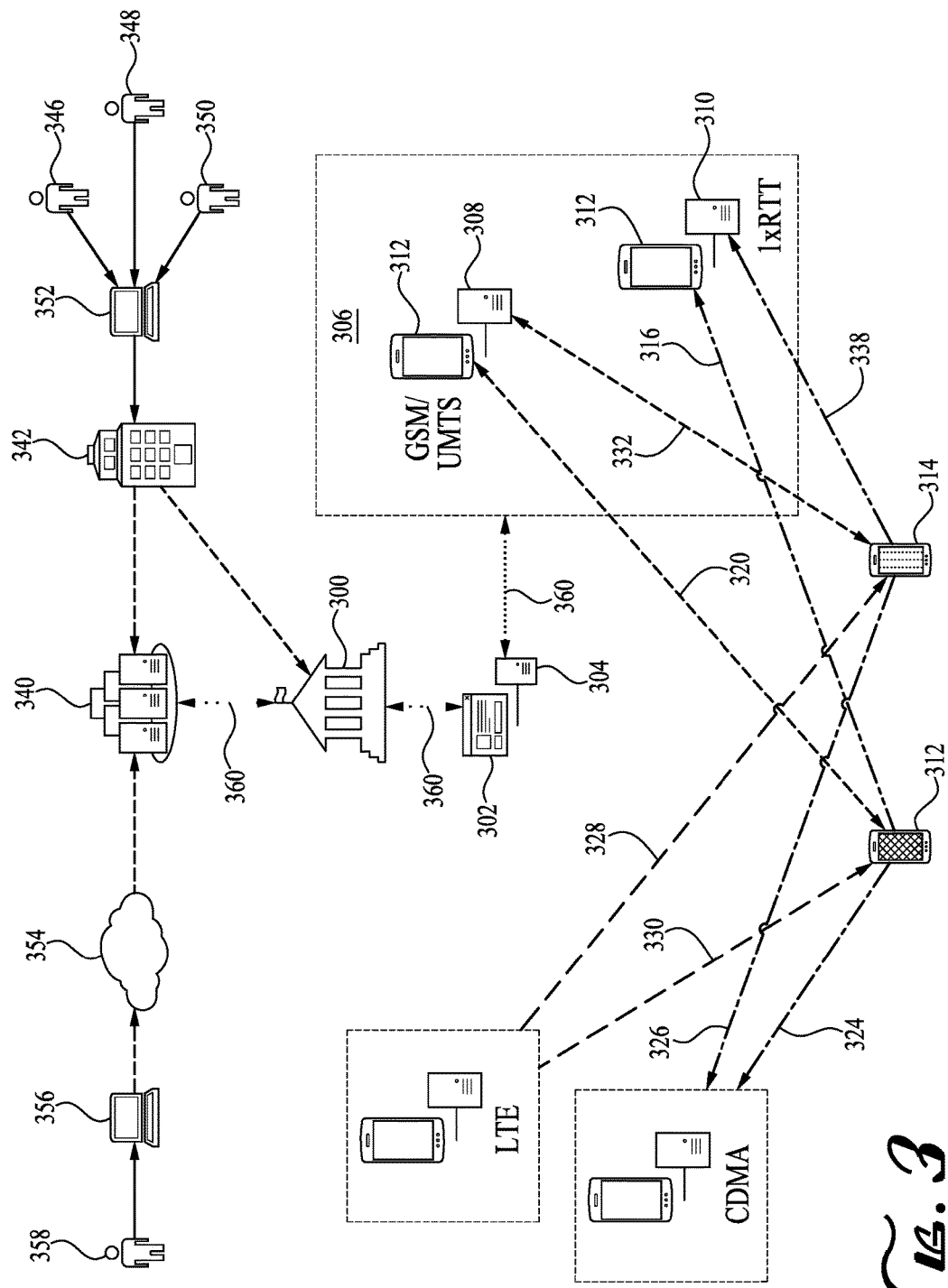
FIG. 3 is a diagram of an implementation of a managed access system having local and remote sites.

FIG. 3 is a diagram of an implementation of a MAS having local and remote sites. A correctional facility, represented generally by icon 300, includes within its perimeter a system core 306 housing a processing system and a DAS configuration including one or more base transceiver stations 304. The system core 306 may be in a central location at the facility 300 or it may be distributed in more than one area within the facility. For example, the client interface may be included in a separate terminal within the facility. The system core 306 may otherwise reside on one more computing devices.

The system core 306 may include, in one embodiment, a local database for storing data relevant to user profiles, authorized and unauthorized wireless activity, configuration settings, and the like. The processing system of the system core 306 further runs a graphical user interface 302 to enable authorized users to interface with the data in the local database, to perform management functions for authorized wireless devices, identification and data collection functions for unauthorized wireless transmissions, reporting of information regarding such activity, and configuring system settings.

One or more base stations 304, 308, 310 within the correctional facility may be integrated to the system core. As described above, the base stations may be coupled via fiber connections to a distributed antenna system (DAS) for enabling coverage by the MAS of a defined geographical umbrella within or otherwise covering the facility 300. In one configuration, a base station has a mode that is associated with the technology of a particular carrier. For example, one base station mode may support a GSM/UMTS system (2G/3G), while another base station mode may support a CDMA 1×RTT system (2G). Additional modes base stations may be integrated to the core. For modes not integrated, such as modes using LTE (4G) technology and CDMA 1×EVDO (3G) per the example in the FIG. 3, the MAS may be configured to deny service for carriers associated with these technologies. In other implementations, additional base stations or additional modes incorporating these technologies are integrated to the core. A single base station may be configured with multiple modes.

In the example shown, base station 308 is configured to be compatible with GSM/UMTS, and base station 310 is configured to be compatible with CDMA 1×RTT. It is assumed for illustration purposes that unauthorized device 312 and authorized device 314 constitute multi-mode devices. As indicated by dashed lines 320 and 316, respective transmissions by unauthorized device 312 are received and intercepted at base stations 308 and 310, respectively. (An exception may be made for emergency calls). In the illustration it is also assumed that base station modes supporting LTE and CDMA 1×EVDO are not integrated to the system core 306 so that if LTE and CDMA 1×EVDO signals are received from either of unauthorized device 312 or authorized device 314 as represented by dashed lines 324 and 326, service is denied, and a network denial of service (DoS) message is returned to the devices 312, 314, as represented by dashed lines 328 and 330, respectively. Transmissions from authorized wireless device 314 based on GSM/UMTS or CDMA 1×RTT are received and, subject to verification, permitted as shown by dashed lines 330 and 338.

With further reference to FIG. 3, a remote database 340 resides in a location outside the correctional facility. In some embodiments, the remote database 340 may reside in a network operations center (NOC) or another centralized facility managed, for example, by a MAS system supplier. In the embodiment shown, the remote database 340 is located in one geographical region and is connected by means of a secure network connection to a separate NOC 342. Each of these entities is connected with one another via a secure network connection.

At the NOC 342, NOC technicians 346, RF engineers 348 and system engineers 350 may collectively access the remote database 340 via an NOC operator interface 352. This is in addition to the graphical interface 302 at the correctional facility 302, where individuals having various user permissions may access various aspects of the MAS. In an aspect of the disclosure, a web-based client GUI 356 is provided for use at a remote location such that any authorized client user 358 can access the MAS functionality and associated local and remote databases via the Internet 354.

The bidirectional arrows 360 in FIG. 3 indicate that data in the local database may be replicated to the remote database 340, and vice versa, by means of a push/pull operation. In this manner, the remote and local databases can be synchronized to contain the same or similar data sets.

In an embodiment, an authorized client located at the correctional facility 300 can access the local database at the system core 306 and can perform functions commensurate with his or her level of permissions as defined by user profiles associated with the system. Outside the correctional facility, an authorized client 358 can access the system, as described above, using the web-based GUI 356. Depending on the user's permissions, the user can access both the local database and the remote database 340 to perform various functions or to view data collected at the facility 300. For example, an investigator of contraband that is affiliated with the particular facility 300 can access the system remotely via the web-based GUI 358 to view data retrieved on the MAS involving the interception of unauthorized wireless transmissions. An authorized employee of the supplier of the MAS, for example, can similarly access the system via the web-based GUI 356 (or, if the employee is at the NOC, via the operator interface 352) to remotely adjust the configuration and settings of the MAS. The employee can access, with the appropriate permissions, either the local database or the remote database as noted above.

In an aspect of the disclosure, if the MAS supplier has additional MASs installed at other correctional facilities, each such facility may include a local database of its own, and the employee, if authorized, can view the local databases (e.g., directly or as replicated on the remote databases) and can adjust the settings and configurations at the various MASs. If the employee is working with data in the remote database 340, the remote database can then be synchronized with the affected local databases.

FIG. 4 is a screen view of a data report 400 of a GUI for providing potentially actionable data 402 relevant to wireless activity within a correctional institution. The columns of the data report 400 represent various data parameters that relate to wireless activity within the facility, including outgoing telephone calls and text messages sent by inmates from within the facility. The GUI screen shown provides a view of the time the call was made, the SIM ID including telephone number, hardware ID, an identification of the carrier, the signal power, and the frequency band. Outgoing telephone numbers are captured as well as the text of detected messages, as shown in boxes 402, 404. This data can be provided in other suitable formats and can be tagged. A copy of this data can be replicated at the remote database as discussed with reference to FIG. 3, above.

Figure 15:
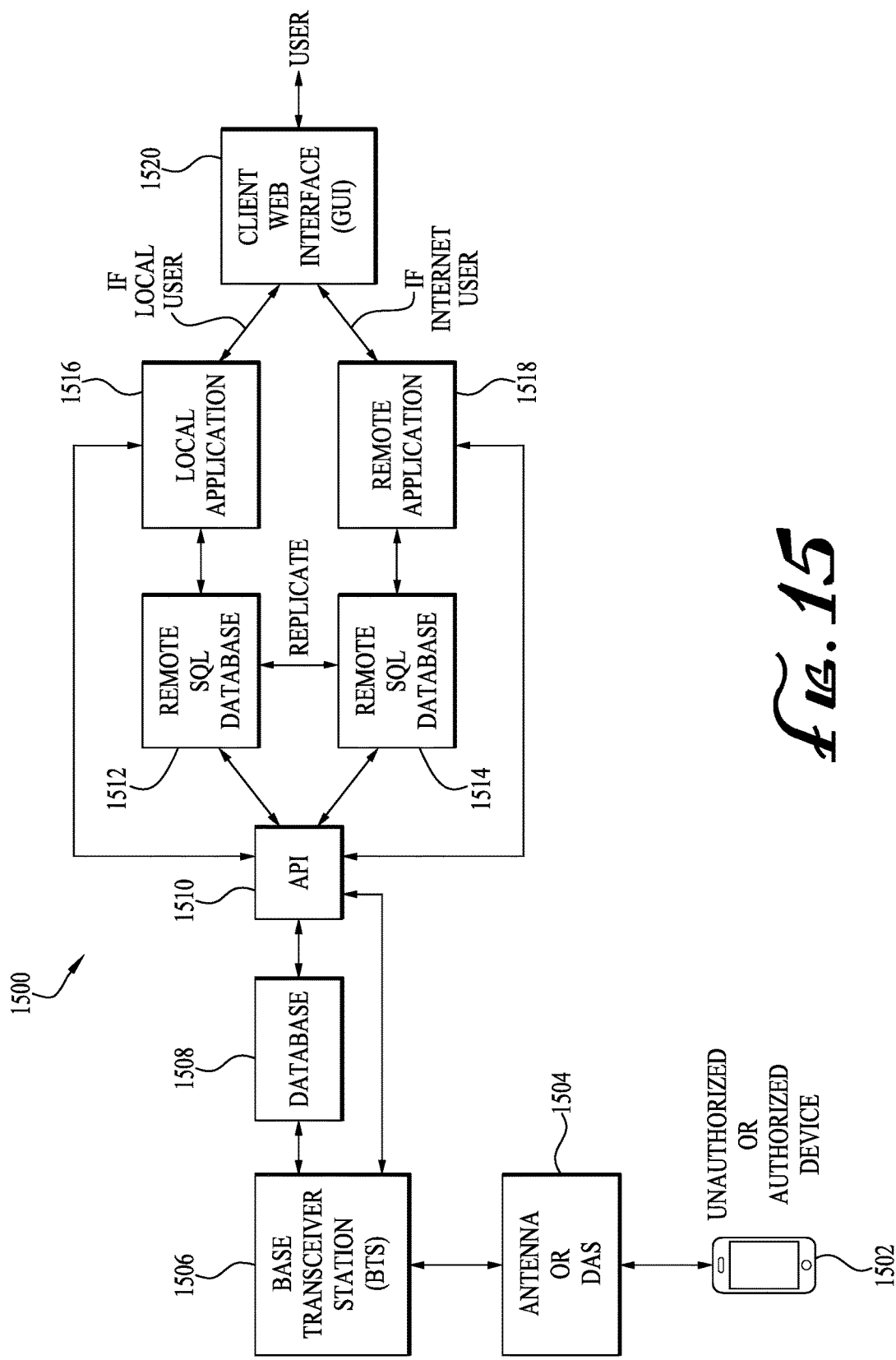
FIG. 15 is a flow diagram illustrating the flow of data in the MAS between a user and the wireless devices.

FIG. 15 is a flow diagram 1500 illustrating a data flow between a user and a wireless device within the MAS. A user logs onto a client web interface (GUI) (1520). If the user is located at the correctional facility, the web-based GUI 1520 will interface with local application 1516 (IF local user). If the user is located remotely (e.g., at a NOC or any location with internet access), the web-based GUI 1520 will interface with remote application 1518 (IF Internet user).

BTS 1506 is coupled to antenna or DAS 1504 in the manner described above. DAS 1504 includes an RF interface and is configured to receive and transmit RF cellular signals to one of unauthorized or authorized wireless devices 1502. The demodulated signals from DAS 1504 are provided to BTS 1506. BTS 1506 extrapolates the relevant data based on these signals (e.g., hardware ID, text content, etc.) and also provides other data such as the time of an attempted call. Other data, such as DoS messages, can be provided by the BTS 1506 to TAS 1504 for transmission to the cellular device 1502.

Local application 1516 and remote application 1518 constitute in this embodiment the backend web applications for rendering in the web interface 1520 for interfacing with local SQL database 1512, remote SQL database 1514, and API 1510 under various circumstances. For example, the local and remote applications 1516 and 1518 may interface with the local and remote SQL databases 1512 and 1514, respectively, to pull data from the databases. The local and remote applications 1516 and 1518 may interface with API 1510 in other situations, such as, for example, when initiating an emergency shutdown of BTS 1506. In this latter situation, the SQL databases 1512 and 1514 may be bypassed.

Data replication procedures may be conducted by local and remote SQL databases 1512 and 1514. The replication can occur in real time, e.g., when a user is remotely logged on and the MAS at the local database is actively receiving information.

API 1510 is configured to push data to the SQL databases 1512, 1514. The SQL databases 1512, 1514 push back to API 1510 any changes to the authorized/unauthorized device users. For example, if a user makes a removal to an entry on the list of authorized users, SQL databases push data back to API 1510 back to database 1508 and to BTS 1506 to indicate the removal of the authorized device. The local application 1516 bypasses the SQL database 1512, for example, during emergency shutdown procedures as indicated above or for providing a BTS status screen to GUI 1520. The local application 1516 in this situation is directly querying API 1510 to determine the up status or down status of BTS 1506.

Data from device 1502 (e.g., phone call records, text message contents, etc.) is ultimately written to local and remote SQL databases 1512, 1514, and the local and remote applications 1516, 1518 access the data via the databases. Specific actions directed to the BTS 1506, in this embodiment, are issued directly to API 1510, bypassing the databases. Such specific actions can also bypass database 1508, as shown by the arrow between API 1510 and BTS 1506.

Figure 5:
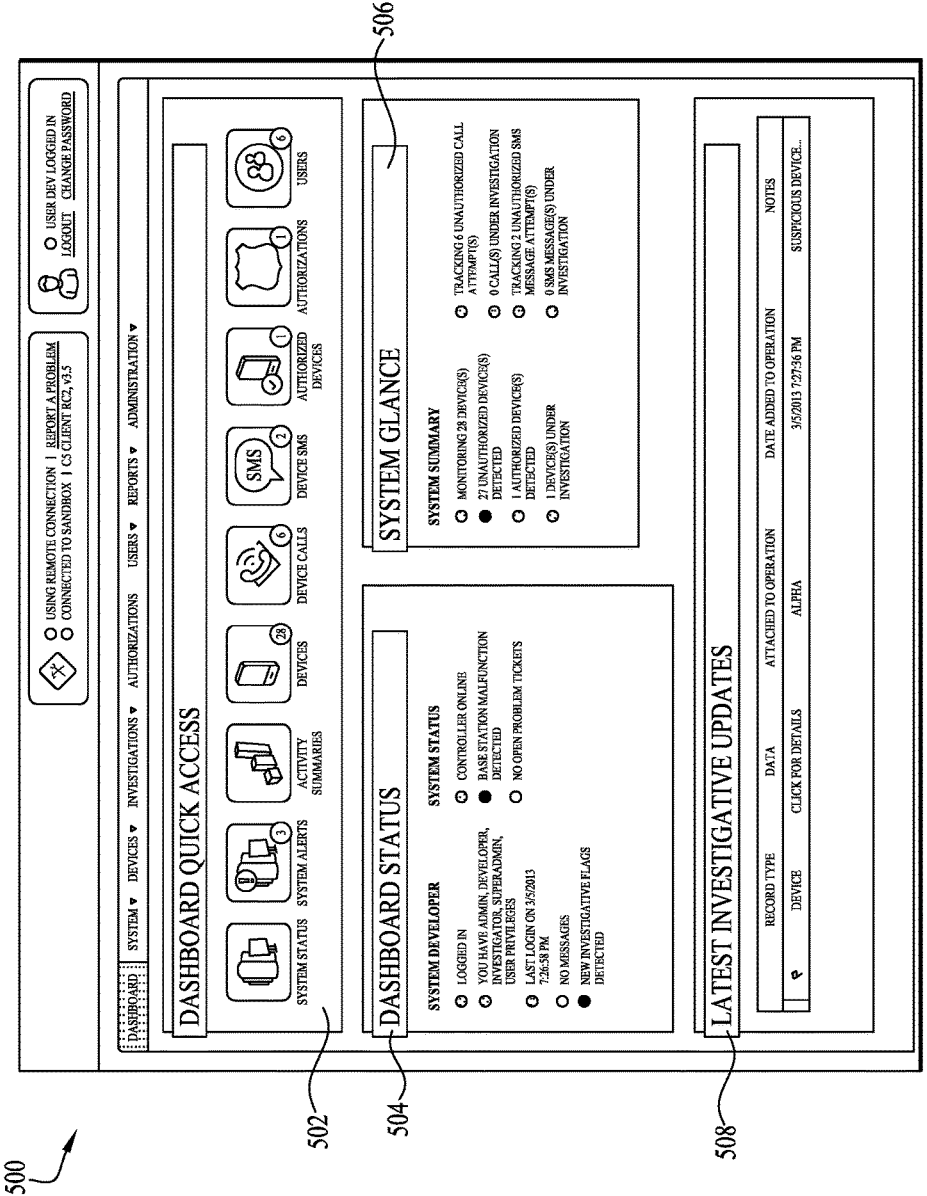
FIG. 5 is a screen view of a dashboard display of the graphical user interface.

FIG. 5 is a screen view of a dashboard display 500 of the graphical user interface. Upon logging into the system, a user having the appropriate permissions can view quick access links 502 to frequently used items such as system status, system alerts, activity summaries, devices, device calls, device SIMS, an authorized device list, a list of authorizations provided, and information regarding users of the system. A dashboard status 504 also provides a summarized overview of the system health, user status, and other interface messages. The dashboard status includes various information concerning the system developer (e.g., supplier of the MAS) and system status.

The dashboard display further includes a system glance region 506 which provides a summary of key features of the system, such as the number and identity of wireless devices being monitored, the number and identity of authorized and unauthorized devices detected, and the like. In an embodiment, certain data on this screen is not made available to all users, as the availability of this data is governed by the user's permissions.

Investigative updates 508, shown at the lower portion of the display, can be used by investigators for information concerning current investigative operations including the latest investigative activity.

Figure 6:
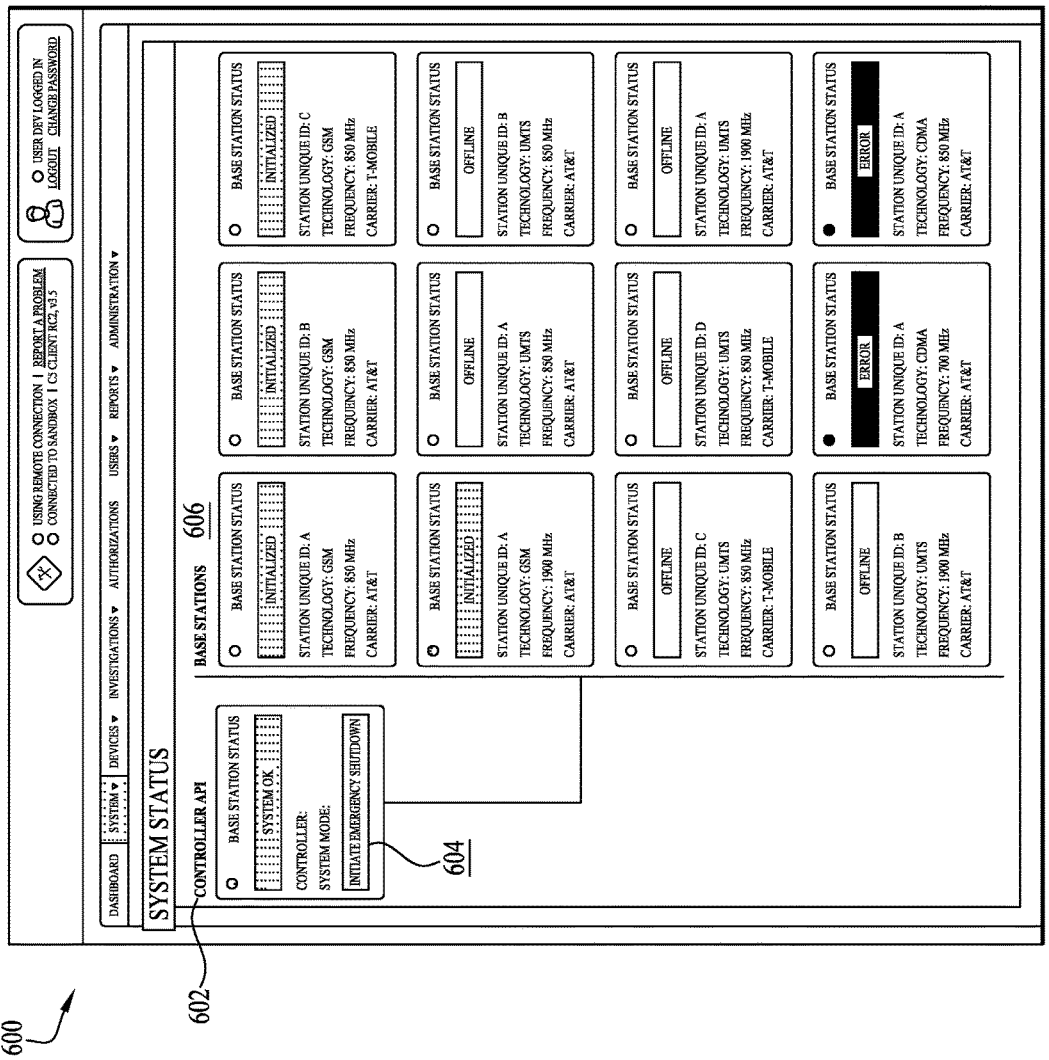
FIG. 6 is a screen view of a system status display of the graphical user interface.

FIG. 6 is a screen view of a system status display 600 of the graphical user interface. In the example shown, the screen provides a view of the controller API status 602. The controller API may include the backend service of the GUI shown. The controller API, in one implementation, is responsible for the primary communication between the system hardware and software. It will either report as OK (working properly) or ERROR (indicating a malfunction or communication fault). The controller API status also shows a box for "initiate emergency shutdown" 604. Emergency shutdown allows a user having sufficient profile (e.g., admin or greater) to deactivate the MAS by shutting down the hardware and temporarily suspending the data capturing features of the system.

The remainder of the screen includes status information 606 for the base transceiver stations (BTS). BTSs may have various modes based on their carrier technology (e.g., GSM, CDMA, LTE, etc.). BTSs report back on their current status based upon these modes. As an example, common statuses for GSM/UMTS and CDMA are transmitting (the BTS is online and broadcasting), initialized (the BTS is online but not broadcasting), offline (the BTS is offline) and error (the BTS is reporting a hardware or communication fault).

The status information further may include various identifiers. For each base station, key identifiers may be reported back to this screen that can assist an operator in identifying base station hardware inside the correctional facility. The identifiers may follow the format: Technology>Carrier>Frequency>Station Unique ID. These identifiers in combination provide a unique identification for each base station. Multiple BTSs may share the same values of some of these identifiers, but it is the combination of all of them that uniquely identifies the BTS.

FIG. 7 is a screen view of a gridview display 700 of the graphical user interface. This screen provides various options for a user and provides a devices overview 702 as well as a region 704 to search and filter data of interest. Each column 706 corresponds to a particular field or category. In one configuration, the fields or columns can be sorted via clicking, ascending and descending operations. A region 708 permits a user to view all system devices, for example, or to view only devices currently active (as illustrated). Visual icons 710 may also be used adjacent each row to indicate the presence of notes, flags, SIM swaps and other items. An option for auto refresh 712 of the screen information is also provided. A "details" region 714 opens a details dialog for the identified device. An "investigation" region 716 opens an investigation panel to enable an investigator to commence or modify an investigation for the record shown.

Figure 8:
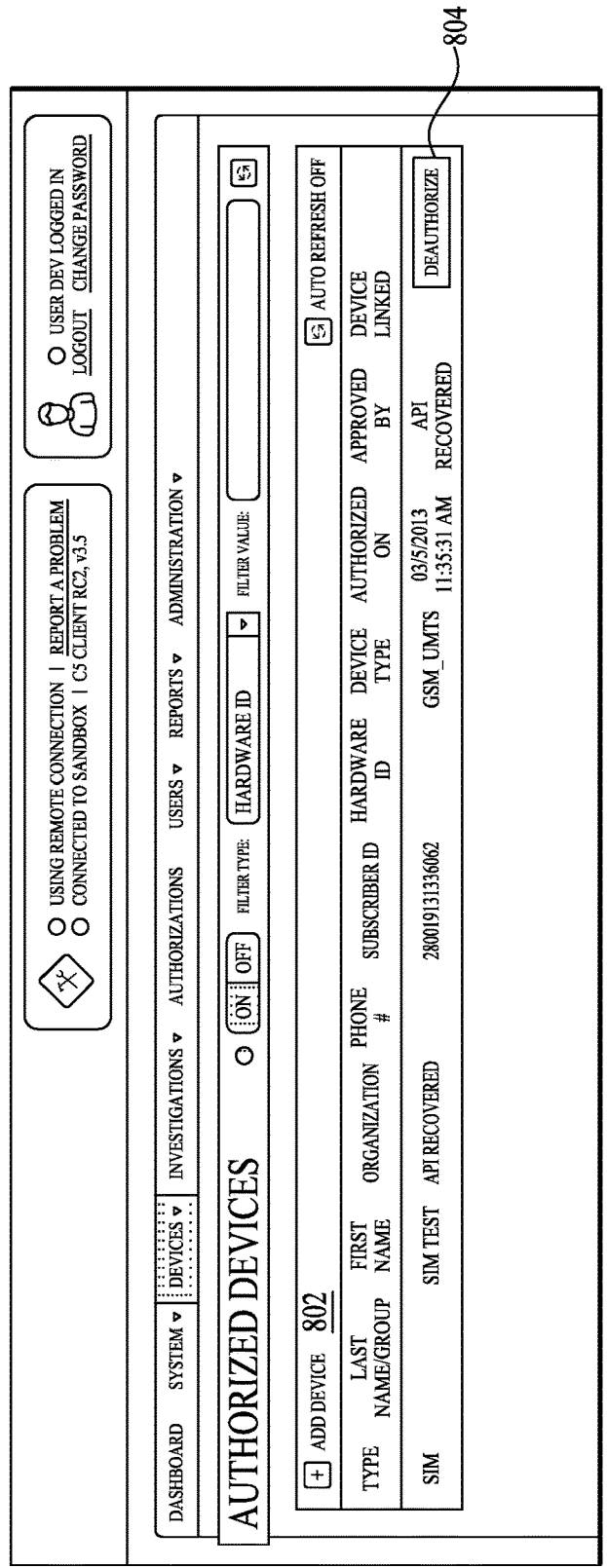
FIG. 8 is a screen view of an authorized devices gridview of the graphical user interface.

FIG. 8 is a screen view of an authorized devices gridview 800 of the graphical user interface. This screen has similar functionality to other gridviews, including filter options, column sorting, and auto refresh. Through this interface an authorized user can also manually add a device to the list of authorized devices, as shown in region 802. The view in this screen provides authorized device details including last name or group, first name, organization, telephone number, subscriber ID, hardware ID, device type, whether time and date of authorization and identity of the approver. The screen also displays a region 804 for deauthorizing a device, e.g., when a corrections officer associated with a particular phone leaves the employ of the facility.

Figure 9:
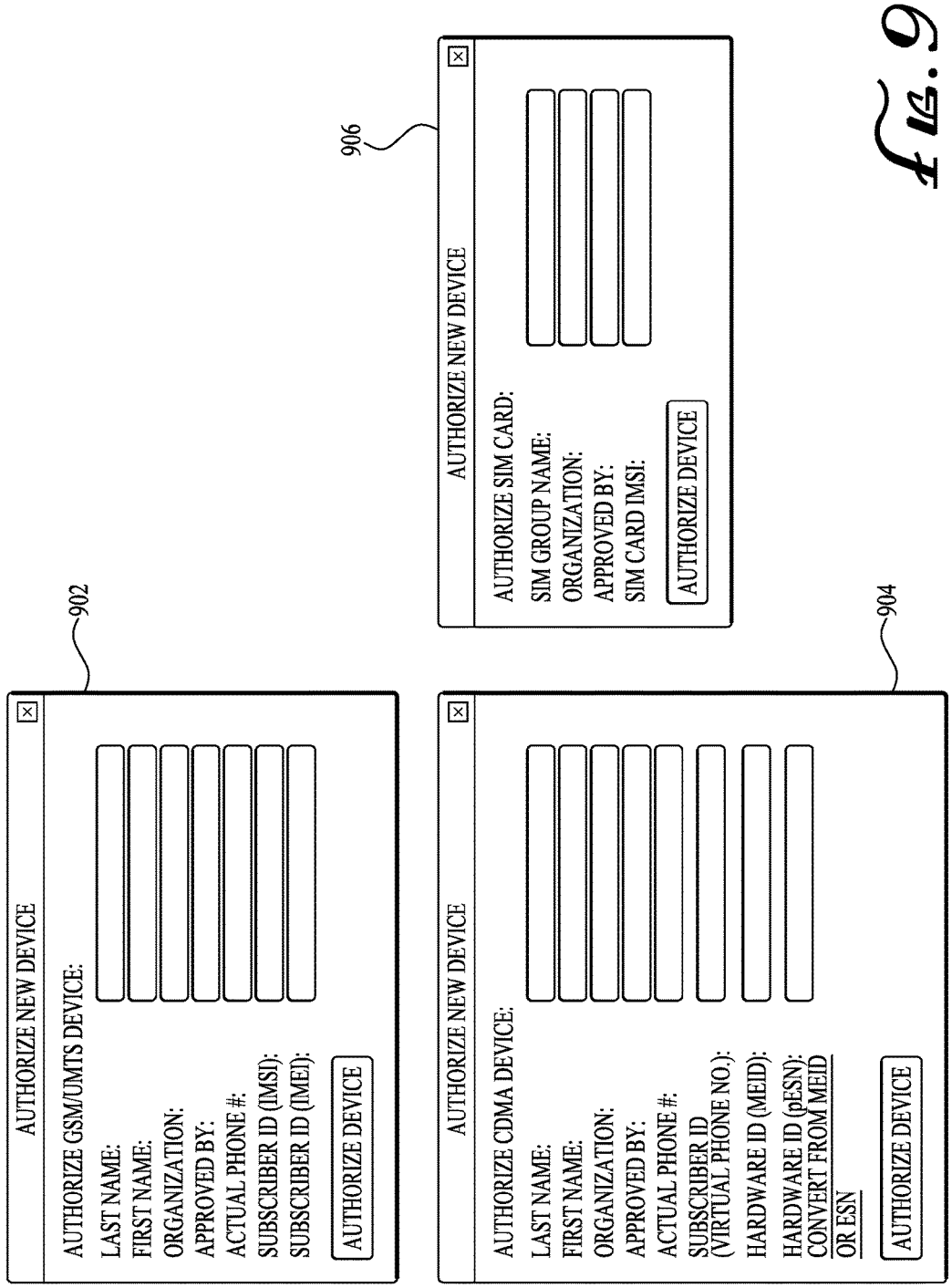
FIG. 9 is a set of screen views authorizing/deauthorizing devices of the graphical user interface.
Figure 10:
FIG. 10 is a screen view of a dialogue box for confirming deauthorization of the graphical user interface.

FIG. 9 is a set of screen views authorizing/deauthorizing devices of the graphical user interface. FIG. 9 shows three screens providing three ways to authorize or deauthorize a wireless devices. Screen 902 allows a user to authorize a GSM/UMTS device, screen 904 allows the user to authorize a CDMA device, and screen 906 allows the user to authorize a specific SIM card. FIG. 10 is a screen view of a dialogue box 1000 for confirming deauthorization of the graphical user interface. Via the dialogue shown in FIG. 10, deauthorization requests can be made subject to the insertion of a user password for security purposes.

Figure 11:
FIG. 11 is a screen view of an event log of the graphical user interface.

FIG. 11 is a screen view of an event log 1100 of the graphical user interface. Each time a user event occurs, meaning anytime a user manipulates data (e.g., authorizing a wireless device), the interface logs the event and the associated details in this display. The type and nature of the action is identified, as well as the status of the action (i.e., success or failure), the identity of the user responsible for the action, and the date the action occurred.

Additional displays may be provided for managing users including adding, by an administrator, to the MAS account and providing details relevant to the user (name, job title, place of employment, contact information, etc.). In an embodiment, a multi-user role structure includes four profiles. A user profile provides a user with access to basic functionality of the MAS including, for example, basic access to Device, Calls and SMS logs, System Status, System Alerts, and Reports. The user profile provides the user with read-only-access on all aspects of the MAS. An authorizer profile includes access given to the user profile plus additional access to device authorization/deauthorization functions, and System summary data related to these functions (e.g., unauthorized versus authorized device counts, etc.). An investigator profile includes access given to the user profile plus access to investigative functions such as investigative records and operations, and system summary data related to the these functions (e.g., how many devices, calls, or SMS messages are under investigation, etc.). An admin profile includes access given to the user and authorizer profiles, plus access to user management functions (e.g., creating, deleting, and managing user data for the GUI) as well as access to various interface settings such as Message of the Day, and Investigative Alert Settings.

The MAS Graphical User Interface

A client graphical user interface (GUI) may be implemented to enable investigators and other authorized personnel at the correctional facility to view and interact with the data received by the base transceiver stations at the MAS. The GUI may constitute a secure application that requires valid login credentials to access the interface. These accounts are generally managed through the GUI itself by administrators. The software implements and extends the ASP membership schema and classes to accomplish this.

The software also may utilize roles that are implemented through the ASP membership schema. For example, each user account may automatically be assigned the role of user. If that role is taken away, then the user's account may be considered inactive. Roles can determine the level of access and visibility to users of various aspects of the GUI. Both the roles and user memberships may be managed through System.Web.Security namespace. The System.Web.Security namespace contains classes that are used to implement ASP.NET security in Web server applications. Each user also may be associated with a corresponding profile that can be stored in the ASP membership schema. The user's profile properties may be defined by the software's web configuration and can be made editable through the GUI's internal user management system. The profiles are implemented using the System.Web.Profiles namespace. The System.Web.Profile namespace contains classes that are used to work with ASP.NET user profiles in Web server applications.

In one configuration, the GUI is a .NET 4.0 WebForms website, developed in C#. C# is a multi-paradigm programming language developed by Microsoft that encompasses strong typing, imperative, declarative, functional, generic, object-oriented (class-based), and component-oriented programming disciplines. Each page of the website may include a Presentation Layer (the ASPX file) and Logic Layer (the .CS code-behind file). The Model Layer of this GUI is handled via LINQ classes that are derived from the software's corresponding database.

Each instance of the GUI application has a corresponding database at a local site. In an aspect of the disclosure, a remote site may also be implemented. The remote site may, in some embodiments, be included at a network operations center (NOC). The NOC may run one instance of the GUI application and one database for each of the corresponding local sites. In other words, the relationship at a local site is one-to-one (one application instance to one database), while at the NOC it is one-to-many (one application instance to multiple databases).

Figure 12:
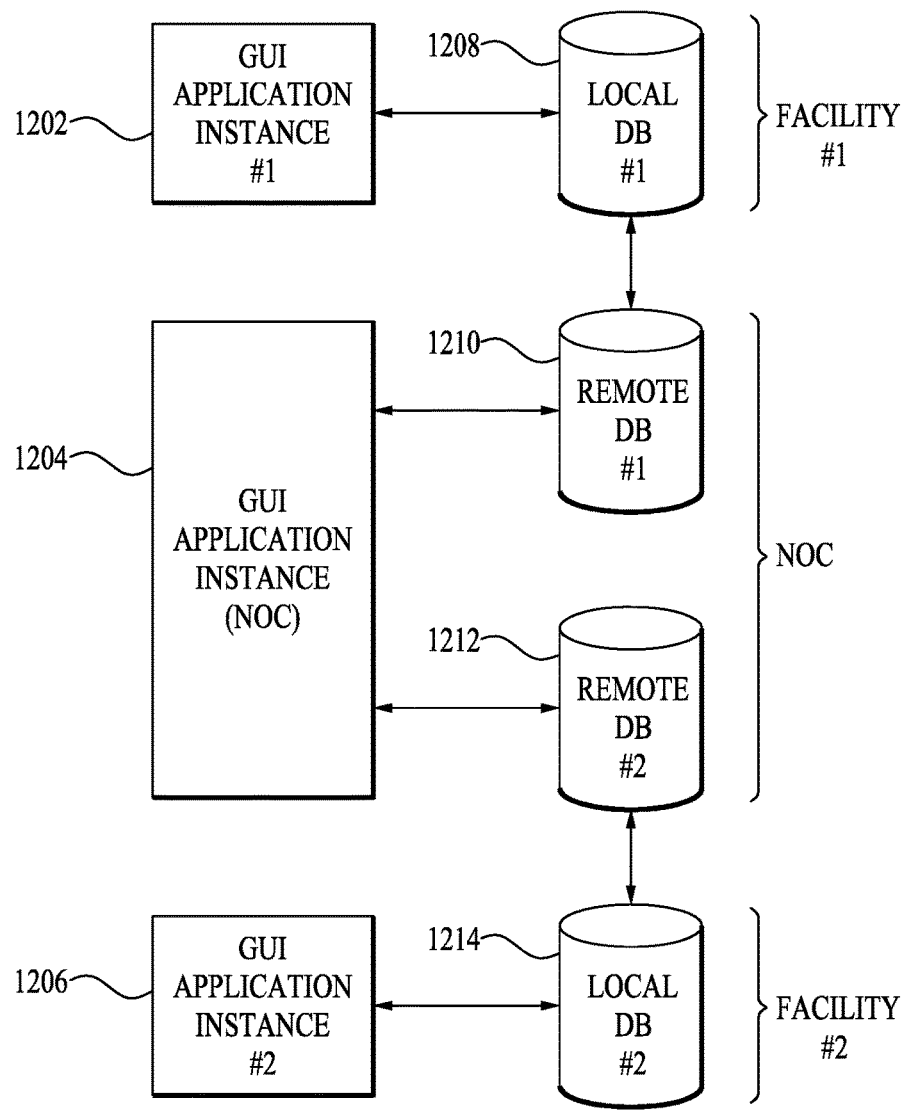
FIG. 12 is a conceptual diagram of the MAS database structure.

FIG. 12 is a conceptual diagram of the MAS database structure in the case where a MAS is installed at each of two correctional facilities. A first instance of a GUI application 1202 initiated by a first user at a first facility corresponds to, and is configured to interface with, a first local database 1208. A second instance of a GUI application 1206 executed by a second user at a second facility corresponds to, and is configured to interface with, a second local database 1214. It is assumed here that a third user at remote facility (NOC) has the required authorization to access the MASs at both the first and second facilities. At the NOC, an instance of a remote GUI application 1204 corresponds to, and is configured to interface with, both a first remote database 1210 that includes data replicated from first local database 1208, and a second remote database 1212 that includes data replicated from second local database 1214.

Figure 13:
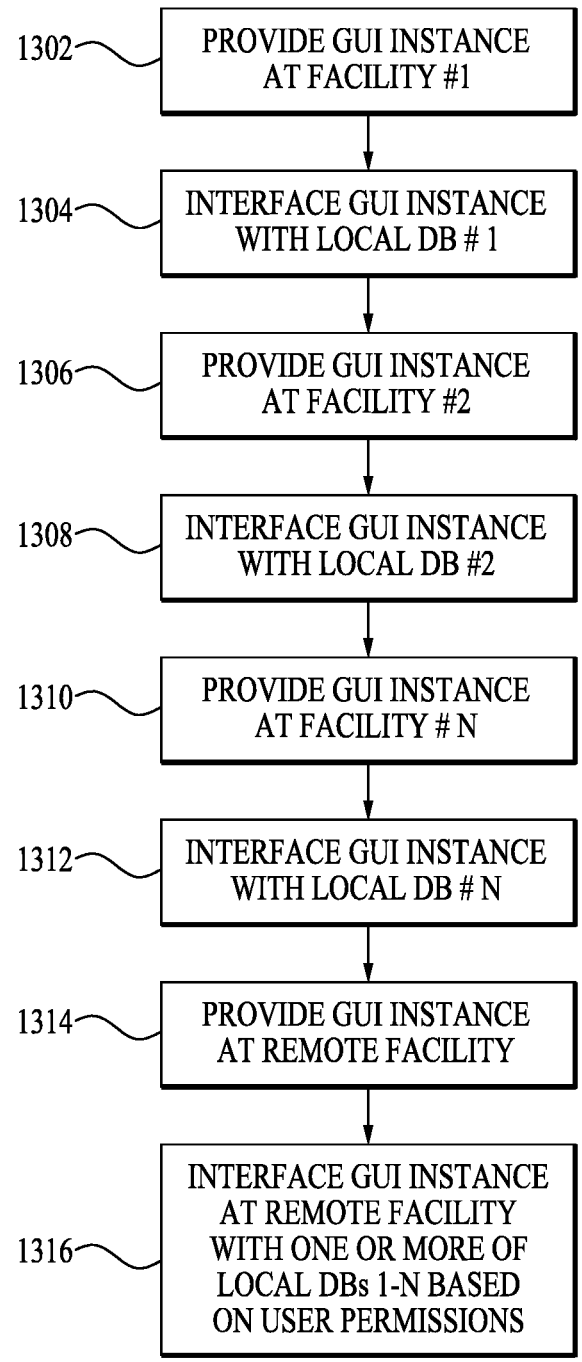
FIG. 13 is a flow diagram illustrating the interfacing of graphical user interfaces with MAS databases.

FIG. 13 is a flow diagram illustrating the interfacing of graphical user interfaces with MAS databases in the case where there are N correctional institutions managed by an NOC. A first instance of a GUI is provided at a first facility (1302). The first GUI instance provides an interface to a first local database at the first facility (1304). A second instance of a GUI is provided at a second facility (1306). The second GUI instance provides an interface to a second local database at the second facility (1308). An Nth instance of a GUI is provided at an Nth facility (1310). The Nth GUI instance provides an interface to an Nth local database at the Nth facility (1312).

At the NOC, a remote instance of a GUI is provided (1314). The remote GUI instance provides an interface to any one or more of local databases 1–N based on the permissions of a remote user. In an embodiment, this interface is accomplished via remote databases 1–N that are configured to correspond to, and replicate data between, respective local databases 1–N. The remote instance of the GUI provides an interface to one or more of the local databases 1–N based on the permissions of the user (1316).

The databases may be composed, for example, of various standardized tables, views, and stored procedures, the schemas and designs of which may be kept standard in each database instance. The GUI may use a "smart login" process to determine if a user is accessing a local-running version of the application, or the remote version hosted at the NOC. A key difference between the two types of the application is that, at the NOC, the user can log into multiple databases if they have access to multiple sites. This logical structure may be maintained through an NOC Client GUI, which is installed at every local site and is also installed at the NOC. This NOC Client GUI may maintain the settings for the Client GUI at the corresponding facility (local or NOC). The NOC Client GUIs running at the local sites may configure the local GUI there to run in a local configuration, which limits logins to the GUI to that site's database only. The NOC GUI running at the NOC may be configured to let the user select their site and database if they have access to multiple sites.

This process using local and remote sites may be achieved by data replication from the local site database up to the NOC databases. Each site database may be replicated up to the NOC in its own separate database, which should contain the exact same data as contained the local site database itself.

Upon a successful login of a user, the corresponding GUI may examine its configuration as determined by its NOC GUI, and may also identify the user database/site selection (if applicable) to generate a connection string to the correct database for that user. This means that connection strings to the data can be made dynamically, on a per user basis. Dynamic connection strings are possible because sessions (user instances) are maintained through a centralized NOC database. The tables contained in this database may be used to keep a record of each session, its associated connection string data, and other important information such as Geo-Location data for incoming connection monitoring within the NOC Client GUI, and the like.

The Data Process

In an embodiment, the flow of data from the hardware at the correctional facility to the GUI follows this pattern:

[Hardware]->[BS Database]->[API]->[Backend Application]->[Local Site Database]->[ NOC (remote) Database]

The hardware identified above includes one or more base stations at the correctional facility. The base stations may be part of a DAS and coupled to a processing system at the facility, which in some configurations is included as part of a system core. As described above, the processing system may include one or more processors in a single computing device, or the processing system may be distributed across different computing devices in different locations at the facility.

The data flows from the hardware to the BS database. The base station (BS) database may include a database of the base station, and in some embodiments the database may include a virtualized server running on the processing system at the facility. From the BS database, the data flow proceeds to the application programming interface (API). In an embodiment, the API is an application running on the processing system. The backend application, to which data flows from the API, may similarly run on the processing system. In an embodiment, the local site database that stores information relevant to wireless device activity is also present at the system core. The remote or NOC database is located outside the correctional facility, which may be a centralized data center. The local database and the remote database may be considered to be a part of the core integrated system along with the remaining equipment and software at the facility.

At the local level, the GUI may access data from the database at the local site. At the NOC (remote) level, data may be accessed from any of the NOC databases, depending on user privileges.

The API and the Backend Application programs may be configured to run at each local site. The API may be configured with a unique IP address on the local site's network. The Backend application may then be configured by entering the API IP address into its configuration settings. This allows for the Backend application to be easily deployed at multiple sites with the change of some simple configuration settings. One function of the API is to make data from the database available to the Backend application and local and remote sites by implementing contracts and query functions within the API. The Backend application may work with the API by running a set of queries against the API at time intervals defined in the Backend application's configuration settings, collecting the resulting data, and storing the data within the local site database. The data in the database can then be replicated up to the NOC via data replication.

The most common breaking points for the data flow process are the API and the Local Site to NOC Database data replication. If there is a fault in the data flow, the problem is likely a broken connection or a failure in one of these two areas.

In an embodiment, a distinguishing feature between the local site applications/databases and the NOC (remote) applications/databases is that the local sites do not require an active Internet connection since the local site applications can communicate directly with the in-network SQL server for data access. The NOC applications, however, are configured to function remotely and are associated with a uniform resource locator (URL) that can be accessed from any device with an active Internet connection. The NOC applications may access their respective databases through a local connection because the applications are hosted by the same SQL server maintaining the databases. The term "using local configuration" or a similar indication may be used in the GUI to provide users logging into the local applications with relevant configuration information. Similarly, the term "using remote configuration" or the like may be used to provide information for users logging into the remote applications will see "using remote configuration."

The Remote API Client

In an aspect of the disclosure, a console application—a component of the API—may be installed at every local site along with the API and backend application. The console application may be configured as a diagnostic tool for the API and to manipulate the data made available by the API through a more direct approach. To use it, the local site's API IP address may be provided to the console application. After that information is provided, the console application may inform the user if the API web service is active or not. This determination may assist in determining any data flow process problems. From the console application's menu, a user can then manually add/remove authorized and engineering devices, review device identity data, review device calls, review device SMS, and the like. Some of these options may be configured to require the user to enter a date range to view data. If the resulting querying returns as an exception, it is probable that the date range was too large and that the API attempted to return too much data. A timeout message may be used that limits how long query requests can take. The timeout feature may be implemented and maintained by the API. To perform specific functions against the API, the appropriate menu option may be selected and then the on-screen instructions followed. The API can provide more support here if needed. This console application may be useful as a direct means of modifying collected data in the database in the event that there is ever data corruption or if there is certain data that is causing issues with the rest of the data flow process.

The Backend Application

The SCI Backend application may be installed at every site and is configured to serve as a way of querying the API service for data and for executing certain commands and contracts. In one configuration, every action related to the API is executed and handled here, rather than the GUI itself. In one implementation, the backend application is a .NET 4.0 WinForms application, developed in C#, which is always running on the local site SQL servers. It is set up to perform a variety of queries and commands based upon the functionality of the GUI. For example, once a device (such as a cellular telephone) has been authorized by means of the GUI, the GUI may flag that device with a Boolean value FlaggedForinsertion=true inside of the authorized device table in the database. If performed at the NOC, those new database values are then replicated down to the appropriate local site. If performed locally, the database values are replicated up to the NOC. In an embodiment, the backend application is only hooked into the local site databases, so in either case the data should be inserted in the applicable local site databases for the expected results to occur. The backend application may cycle its set of queries and commands at a time interval specified in its configuration. In the example of the authorized device, in its next query cycle, the backend application may read the new value for the FlaggedForinsertion property of the authorized devices table. The backend application may then execute the appropriate contract within the API to insert that device into the system as an authorized device. The same example can apply to the deletion of an authorized device, with the table property FlaggedForRemoval being set, rather than FlaggedForinsertion.

In addition to executing the above commands, the backend application may also be configured to fetch data to populate the Device Overview, Device Calls, and Device SMS gridviews within the GUI. The process for doing this can be thought of as the same process that may be used to get device data through the U-TX Remote API Client as discussed above. During its query cycle, the backend application may fetch data based on a date range. The date range may be determined from the last completed cycle's date. For example, if the backend application completed a devices query at Dec. 15, 2015 11:32 am, then, on the next query cycle, the backend application would fetch data with a range of Dec. 15, 2015 11:32 am to the present time. Then the present time would be recorded at the last completed cycle's date and would be stored in the local site's database in a table called 'APITrackings.' This process can be further manipulated by adjusting a Query Offset setting in the backend application window. If supplied, this number will be used to offset the first part of the date range on each query cycle when fetching data. In our previous example, this means that the date range for the next cycle would be Dec. 15, 2015 8:32 am to present time. This option may be made available to make sure every point in time is accounted for when fetching data from the API. Duplicate results may be ignored and not written into the database as new entries. In this manner, only truly new entries are inserted. This methodology is part of the backend applications query structure.

The following is a list of the subqueries that, in one implementation, may be made available during each query cycle of the backend application:

Controller update—Determines the status of the API and writes status codes to the database which are then read by the GUI as 'Controller Status'

Base Station update—Determines the status of the base stations as reported by the API and writes status codes to the database for each station, which are read by the GUI as 'Base Station Statuses'

Devices update—Fetches any newly captured devices that were captured during the last cycle completion date and the present time and writes them to the database. Also updates any last captured times of existing devices that may have been recaptured by the system. These data entries are read by the GUI in the 'Device Overview' gridview Calls updates—Fetches newly blocked calls in the same fashion as devices and writes those values to the database, which are then read by the GUI in the 'Device Call Activity' gridview SMS updates—Same as Calls updates above Authorized device deletions—Removes any authorized devices with the property of FlaggedforRemoval=true in the local site database from the system Authorized device insertions—Inserts any authorized devices with the property of FlaggedforInsertion=true in the local site database to the system Authorize device link updates—Examines the list of authorized devices on the local site database and determines which device identities (if any) correspond to those devices and then makes that connection by writing the device GUID as the device ID to the appropriate data row in the authorized devices table Engineering device link updates—Operates the same as the authorized device link updates except that it is examining the engineering device table Authorized device validation—Ensures that the authorized device table on the local site database and the authorized device list from the API are in sync—if discrepancies are detected, the backend application will automatically overwrite the data in the API with the data from the local database (this data should always be assumed to be the most correct and up-to-date)

If, for any reason, a fault in the backend application's querying process occurs (whether caused by the application itself or returned by the API), the system is designed to handle the exception generated and to keep operating if possible. The exception, along with a date/timestamp, is written to the file "Debug_Log.txt" inside of the backend application's program folder.

The GUI

In an aspect of the disclosure, the GUI is configured to be the presentation aspect of the entire data process, meaning that the GUI is where data is presented to the user, and also where GUI-related features are managed (i.e. User Management). From a broad perspective, the API/BS database may be considered to be the model, the Backend Application the Logic, and the GUI the presentation. However, certain logic may be executed within the GUI itself in order to maintain its inherent features. These features that may be managed internally by the GUI include, for example:

User management (creating, editing, and removing user accounts/profiles and user roles)

Interface settings (theme selection, user-based time zone preferences, maximum gridview result settings, automatic e-mail generation options, etc.)

Investigation management (for flagging and investigating various devices, calls, SMS, etc.)

Event log that shows user activity with the interface (users must be explicitly given access to this through the user management system)

Report a problem feature that allows users to submit a problem ticket to a customer service department of the MAS supplier Ticket management that allows a user in the role of "superadmin" or "developer" to review, update, and close tickets opened through the 'report a problem' feature Report Generation Authorizations management for adding and deleting authorizations that are required to view the content of SMS messages Account management features such as change password and logout Login Procedures The features above, in some configurations, are independent of the API and the data process on that end. Some of these features may help to manage certain aspects of the data in the databases. In some implementations, however, these features have no effect on the original, raw data, and should be considered as internal tools and functions rather than as part of the data process from beginning to end. The GUI may also be configured to handle its own exceptions internally so that the application can continue to run normally. Any exceptions encountered may be recorded in detail into the Glitch log which can be accessed from the NOC Client GUI.

The GUI may be configured to manage settings that are important to the requirements of a correctional facility. These can be accessed through the "Interface settings" page and include:

Login settings which define the remote and local login URL's for the current facility/database logged into.

Developer settings which allow a user in the role of "developer" to temporarily suspend access to the GUI for maintenance or other development efforts that would require this.

Investigative Alert settings which controls how many days the application should look back for new investigative records that are flagged (new investigative records are required to be displayed to and acknowledged by the appropriate investigators in a dialog box).

E-mail setting which allow a developer to turn automatic e-mail generation on or off and to define what e-mail address these notifications should come from (generally speaking these e-mails are auto-generated when a change is made to a user's account or a new user is created).

Interface messages where a 'message of the day' type of message can be entered which appears once upon each user login. There is also an option to turn this feature on or off.

The NOC Client GUI

The NOC Client GUI is referred to herein as an application that manages various database and facility settings, monitors incoming connections to its associated GUI, allows users to view and resolve glitches, and the like.

In an embodiment, a NOC Client is installed anywhere that a GUI is installed because it is configured to manage GUI settings that directly affect login procedures, dynamic connection string building, and facility/database settings. The NOC Client can generally be available at the URL /'SQL Server IP':8080. This application should be run on the same server as the GUI runs and for which the databases are hosted. Only users that have explicitly been given access to the NOC Client will have access to it. This may be accomplished through the associated GUI user management system by developers or through the NOC Client GUI itself.

In an embodiment, the NOC Client manages important aspects of the GUI, such as:

Incoming connection tracking and usage reports, User session management, GUI Glitches, GUI Problem Ticket Management, Remote Server Settings, Local Server Settings, Facility(database) Management, GUI Interface Settings on a facility-to-facility basis, Carrier management (add, update, delete), Interface issue types (used in the dropdown list selections in the GUI's 'report a problem' feature), and User affiliations (used in the dropdown list selections in the local GUI and NOC GUI's user management processes).

User affiliations allow one to create and manage various types of "rules" for a given affiliation. For example, user affiliations can be set up so that all users affiliated with affiliation group "A" are all on the same time zone.

The NOC Client may manage additional aspects of the GUI, such as:

User management for all facilities under this NOC Client's control. (The difference here is that, in the GUI, one can only manage users for the facility that the users logged into)

NOC interface settings, which includes:

NOC Client Data server selection (based on servers that have been set up via the remote/local servers management pages)

NOC GeoLocation data—for identifying the location that is running this particular system/client NOC client release/version info GUI Development Settings (Many or most of the important operational settings for the corresponding GUI can be managed here)

NOC Interface Messages (works the same as in the GUI, except that the messages appear upon first logins into the NOC client)

NOC E-mail Settings (works the same as in the GUI, except that this manages auto e-mail generation for the NOC client (used mainly for notifications of new users and account changes)

Facility Vs. Database

The terms facility and database have thus far been used interchangeably within this document. That is because, in terms of the data flow process, there is no difference between them. Each facility has one corresponding database to house the data received from the data flow process. These database names are usually appended with "LocalData_" to distinguish them as such.

NOC and User Databases

In an embodiment, each facility also may have a locally running NOC and User Database, as does the system running at the NOC. The NOC database may contain information about the local and remote server settings that are controlled via the NOC Client GUI. User Databases may be replicated to and from the local sites to the remote NOC via merge replication. This means that the data in each instance of the user database should be in sync on every site and at the NOC. The way site access is determined is through a database field called "LocalSiteAccess" within the 'aspnet_Users' table in the User database. This field contains GUIDs which match GUIDs of facilities maintained in the NOC database (remember Facility data management above). Each time a new facility is created via the NOC Client, the system will, depending on the user selections, setup a corresponding database for the new facility, and add the new facility to the NOC database under the table "Facilities." This is where a GUID will be generated for that facility which is then used throughout the various login procedures to determine to which sites a user has access. The NOC database may also be replicated between the remote NOC and the local sites using selective merge replication, meaning only a few select tables are replicated. Tables regarding features such as incoming connection tracking, etc., are independent of this replication process because that data has to be maintained specifically for the local site that the NOC database is hosted at. Data that is replicated comes from various settings controlled through the NOC Client GUI that should remain constant at the sites (version information, for example). In an embodiment, data that looks as if it is applicable to one site and one site only is not replicated. In an embodiment, everything else is.

What is claimed is:

1. A Managed Access System (MAS) at a correctional facility, comprising:
a non-transitory computer readable medium comprising a local database and code; and
at least one processor configured to execute the code, wherein the code is configured when executed by the at least one processor to:
identify and intercept unauthorized wireless communications from the facility;
perform data management functions on data relevant to the wireless communications activity at the correctional facility and store the data in the local database,
provide a graphical user interface (GUI) for enabling an authorized user to modify configuration settings and to access the stored data,
interface with a processing system at a remote location to enable access to the data at the remote location in or near real time over a network connection, and
enable synchronization between the local database and a remote database accessible via the processing system at the remote location,
wherein an operation for synchronizing the local and remote databases is initiated either locally or remotely to cause the local and remote databases to mutually update their data sets in or near real time to include current copies of data relevant to the unauthorized wireless communications identified and intercepted by the MAS.

2. The MAS of claim 1, wherein the code is further configured to enable an authorized user to adjust MAS configuration settings at the remote location.

3. The MAS of claim 1, wherein the processing system at the remote location is a component of a central facility for managing MASs at a plurality of correctional facilities.

4. The MAS of claim 1, wherein the processing system is a component of a personal computing device.

5. The MAS of claim 4, wherein the processing system runs a web-based application, the web-based application being configured to provide a GUI for enabling the access to the data.

6. The MAS of claim 1, further comprising:
at least one antenna; and
a base transceiver station (BTS) configured to receive, via the at least one antenna, a wireless transmission occurring within the correctional facility,
wherein the code is further configured to process information relevant to the received wireless transmission, store the information in the local database, and allow or deny resulting wireless communications in response to a determination as to whether or not the wireless transmission is authorized.

7. The MAS of claim 6, wherein the code is configured to interface with code run on the processing system to enable an authorized user at the remote location to access the data.

8. The MAS of claim 7, wherein the code is configured to interface with code run on the processing system to enable an authorized user to modify MAS configuration settings.

9. A processing system, comprising:
a computer readable medium comprising a remote database and code configured to interface with a plurality of Managed Access Systems (MASs) located at a plurality of respective correctional facilities, each of the plurality of MASs being configured to enable management in or near real time, via a graphical user interface (GUI), of cellular communications activity, including intercepting unauthorized cellular communications activity, occurring at the respective correctional facility, each of the plurality of MASs comprising a local database for storing data relevant to the cellular communications activity occurring at the respective correctional facility, wherein the remote database is configured to synchronize with each of the local databases over a network connection to enable a remote user to access the data, wherein a synchronization operation of the local and remote databases is initiated either locally or remotely to cause the local and remote databases to mutually update their data sets in or near real time to include current copies of data relevant to the unauthorized wireless communications identified and intercepted by the MAS; and
one or more processors configured to execute the code.

10. The processing system of claim 9, wherein the code is further configured to enable access by an authorized user to configuration settings of the plurality of MASs.

11. The processing system of claim 9, wherein
each of the local databases is configured to store data relevant to cellular communications activity conducted at the respective correctional facility and to synchronize with the remote database via at least one of a push operation and a pull operation.

12. The processing system of claim 9, wherein
the code is configured to provide the GUI at a central facility including the computer readable medium and the one or more processors, and
the GUI is configured to provide access to one or more of the plurality of MASs for an authorized user.

13. The processing system of claim 9, wherein
the data comprises information representing at least one of an authorized and unauthorized wireless transmission from a cellular device located at one of the plurality of correctional facilities.

14. The processing system of claim 9, wherein the computer readable medium is distributed as discrete storage elements across a plurality of computing devices.

15. The processing system of claim 9, wherein the GUI is configured to provide a plurality of user profiles including different permissions based on a type of user.

16. The processing system of claim 9, wherein the computer readable medium comprises one or more of a hard disk drive and a solid state drive.

17. A processing system at a correctional facility comprising:
a computer readable medium comprising code for providing at the correctional facility a managed access system (MAS), the MAS comprising a local graphical user interface (GUI) and a local database and configured to intercept unauthorized cellular communications, record data relevant to cellular communications activity occurring at the correctional facility for storing in the local database and to enable an authorized user via the local GUI to access the stored data in or near real time and to manage the cellular communications activity; and
one or more processors configured to execute the code,
wherein the local database is configured to synchronize with a remote database outside the correctional facility over a network connection to enable a remote user to manage the data via a remote GUI,
wherein an operation for synchronizing the local and remote databases is initiated either locally or remotely to cause the local and remote databases to mutually update their data sets in or near real time to include current copies of data relevant to the unauthorized wireless communications identified and intercepted by the MAS.

18. The processing system of claim 17, wherein
at least one of the local database and the remote database is accessible via web-based application, and
the accessibility is based on known permissions of a user and on at least one selection input by the user via the web-based application.

19. The processing system of claim 18, wherein
the web-based application comprises a web-based GUI,
the code is further configured to interface with the web-based GUI over an Internet connection, and
the web-based GUI is configured to interface with the local database to render the data in a viewable format to an authorized user.

20. The processing system of claim 19, wherein
the web-based GUI is configured to enable management by the authorized user of authorized cellular communications activity and to enable adjustment of settings for intercepting the unauthorized cellular communications activity.

21. The processing system of claim 17, wherein
the local GUI includes settings for enabling use by authorized persons of authorized cellular devices located in the correctional facility while intercepting unauthorized wireless transmissions by devices located in the correctional facility.

22. The processing system of claim 17, wherein the GUI is configured to provide a plurality of user profiles including different permissions based on a type of user.

23. The processing system of claim 17, wherein the computer readable medium is physically distributed as a plurality of discrete components at the correctional facility.

24. The processing system of claim 17, wherein
the local GUI is configured to interface with the local database to render the data in a viewable format to an authorized user, to enable management by the authorized user of authorized cellular device activity, and to adjust settings for intercepting unauthorized cellular device.

25. The processing system of claim 17, wherein
the local database is further configured to synchronize with the remote database via at least one of a push operation and a pull operation.

26. The processing system of claim 17, wherein
the MAS includes at least one base transceiver station (BTS) operatively coupled to the one or more processors, the BTS being configured to receive wireless signals from cellular devices operated within a designated geographical region including at least a portion of the correctional facility, and
the MAS is further configured to receive the data from the at least one BTS corresponding to cellular device activity within the designated geographical region.

27. The processing system of claim 26, wherein
the MAS includes a distributed antenna system (DAS) coupled to the at least one base transceiver station (BTS), and
the DAS is configured to provide coverage for at least a portion of the designated geographical region and to enable capture of a wireless signal from a cellular device at a time when the cellular device is powered on by a user.

28. The processing system of claim 26, wherein
the code is configured to enable an authorized user to initiate, via the local GUI, an emergency shutdown procedure for the at least one BTS.

29. The processing system of claim 26, wherein
the code is configured to enable an authorized user to initiate, via the remote GUI, an emergency shutdown procedure for the at least one BTS.

30. The processing system of claim 17, wherein
the local GUI is configured to render the data in a manner sufficient to enable an authorized user to triangulate a location of an unauthorized cellular attempt.

31. The processing system of claim 26, wherein
the local GUI is configured to render the data from the at least one BTS in a manner sufficient to enable a corrections officer to identify a user of a wireless device involved in an unauthorized cellular transmission.

32. The processing system of claim 17, wherein the synchronizing comprises a data replication operation.

33. The processing system of claim 17, wherein the local database is configured to:
store data relevant to cellular communications activity conducted at the correctional facility, and
synchronize with the remote database via at least one of a push operation and a pull operation.

34. The processing system of claim 17, wherein
the local GUI is configured to render one or more graphical displays of the data in response to a determination of the permissions of a user and one or more selections input by the user via the local GUI.

35. The processing system of claim 17, wherein
the local GUI is configured to render one or more graphical displays of the data in a format that is relevant to an investigator of contraband at the correctional facility.

36. The processing system of claim 17, wherein
the local GUI is configured to enable an authorized user to view the data in a plurality of formats.

37. The processing system of claim 17, wherein
the local GUI is configured to enable an authorized user to manage a list of authorized wireless devices.

38. The processing system of claim 17, wherein the local GUI is configured to generate a log of data identifying parameters related to unauthorized wireless events.

39. The processing system of claim 17, wherein
the MAS is configured to interface with a remote application installed on a personal computer, and
the remote application comprises a second GUI configured to enable an authorized user to access the data or manage the cellular communications activity remotely via the Internet.

40. The processing system of claim 39, wherein
the MAS further comprises a base transceiver station (BTS);
the code further comprises an application programming interface (API), and
the API is configured to receive the data from the at least one BTS and provide the data to the remote application.

41. The processing system of claim 17, wherein
the computer readable medium and the one or more processors are distributed across a plurality of computing devices within the correctional facility.

42. The processing system of claim 17, wherein
the data comprises parameters corresponding to at least one of cellular voice calls, text messages (SMS), and wireless data transfers.

43. A system for managing wireless communications, comprising:
 a local processing system located at a correctional facility and comprising:
 a local computer readable medium comprising local code for providing at the correctional facility a managed access system (MAS), the MAS comprising a local graphical user interface (GUI) and a local database accessible via the local GUI, the MAS being configured to intercept unauthorized cellular communications activity, record data relevant to wireless communications activity occurring at the correctional facility for storing in the local database and to enable an authorized user via the local GUI to access the stored data in or near real time and to manage the cellular communications;
  one or more local processors configured to execute the code;
  a remote processing system located at a network operations center outside of the correctional facility and comprising:
 a remote computer readable medium comprising a remote database and remote code configured to interface with the MAS, wherein the remote database is configured to synchronize with the local database over a network connection to enable a remote user to access or manage the data at the correctional facility, wherein an operation for synchronizing the local and remote databases is initiated either locally or remotely to cause the local and remote databases to mutually update their data sets in or near real time to include current copies of data relevant to the unauthorized wireless communications identified and intercepted by the MAS; and
  one or more remote processors configured to execute the code.

44. The system of claim 43, wherein the remote code is further configured to
 interface with one or more additional MASs located respectively at one or more additional correctional facilities, each additional MAS comprising a respective local database, and
 synchronize at least one of the respective local databases with the remote database over a network connection.

45. The system of claim 44, wherein
 each of the one or more additional MASs comprises a local GUI at the respective additional correctional facility, each of the local GUIs configured to provide an interface to the respective local database.

46. The system of claim 44, wherein the remote code is further configured to provide an interface to the remote database and the local databases.

* * * * *